Nov. 19, 1968 H. F. HILD ET AL 3,412,235
OVEN CONTROL MEANS AND PARTS THEREFOR OR THE LIKE
Filed March 7, 1966 3 Sheets-Sheet 1

INVENTORS
HENRY F. HILD
SIEGFRIED E. MANECKE
BY
*Canden & Canden*
THEIR ATTORNEYS

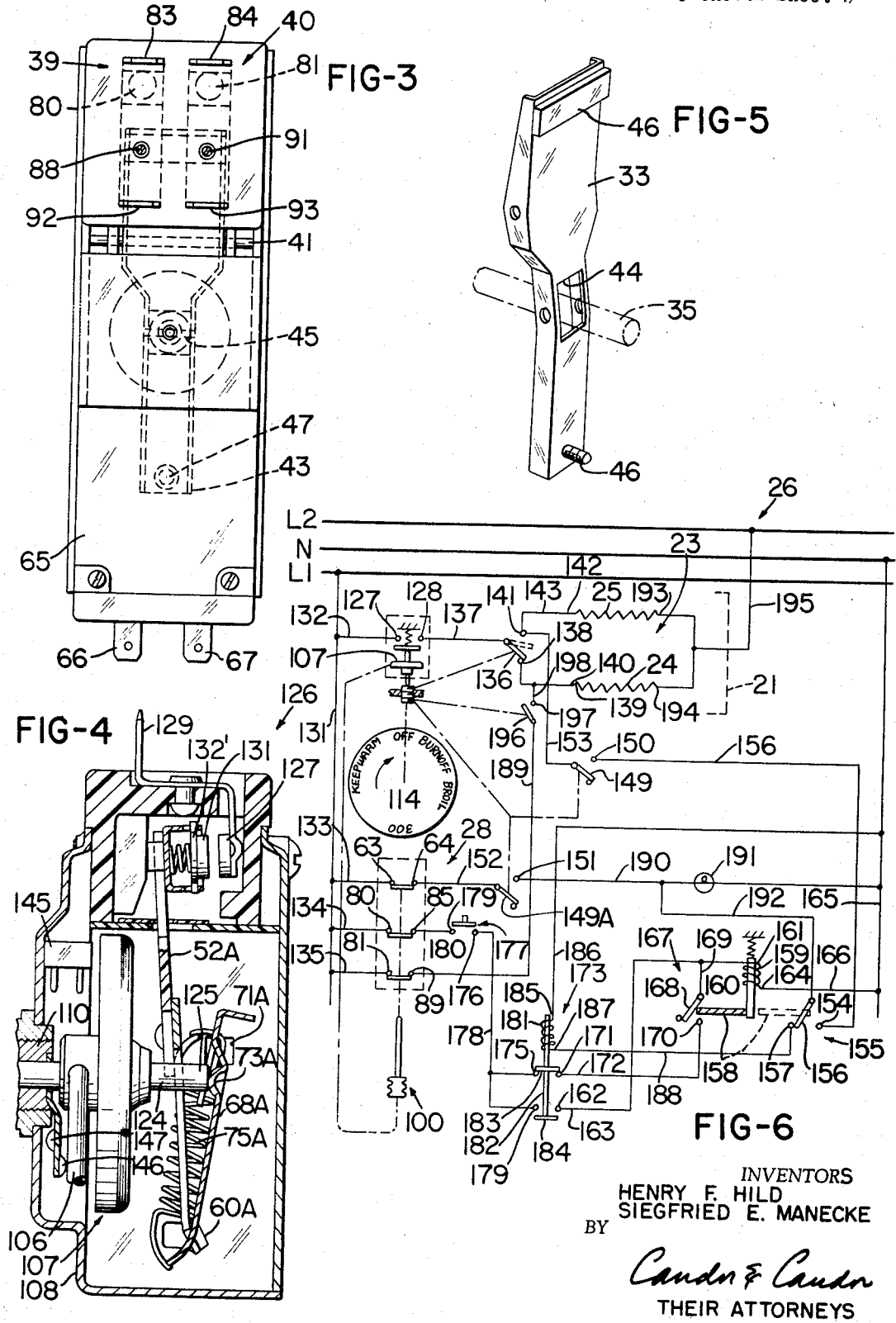

Nov. 19, 1968  H. F. HILD ET AL  3,412,235
OVEN CONTROL MEANS AND PARTS THEREFOR OR THE LIKE
Filed March 7, 1966  3 Sheets-Sheet 3
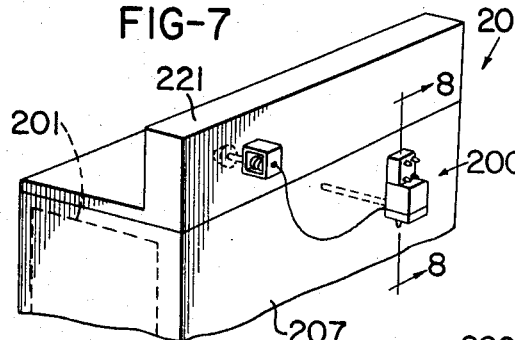
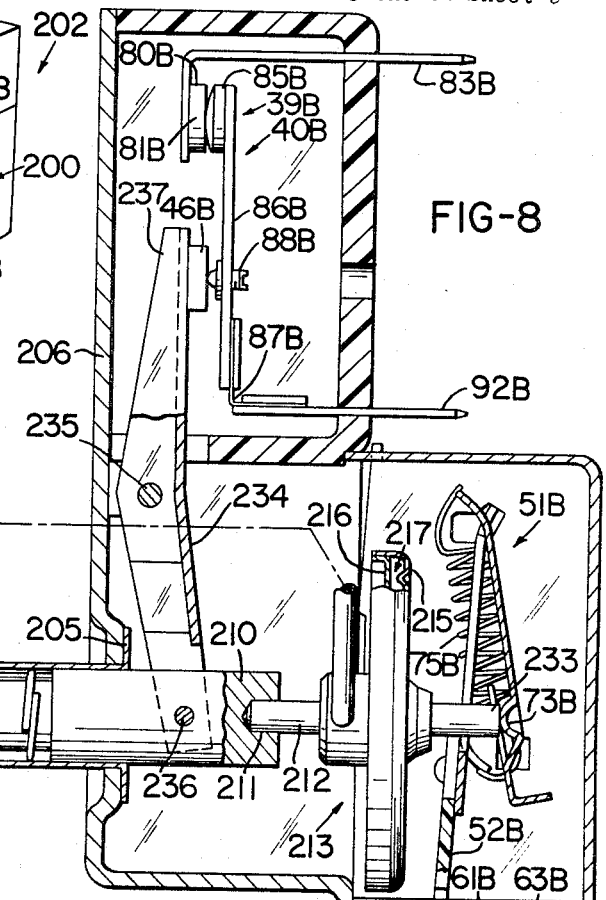
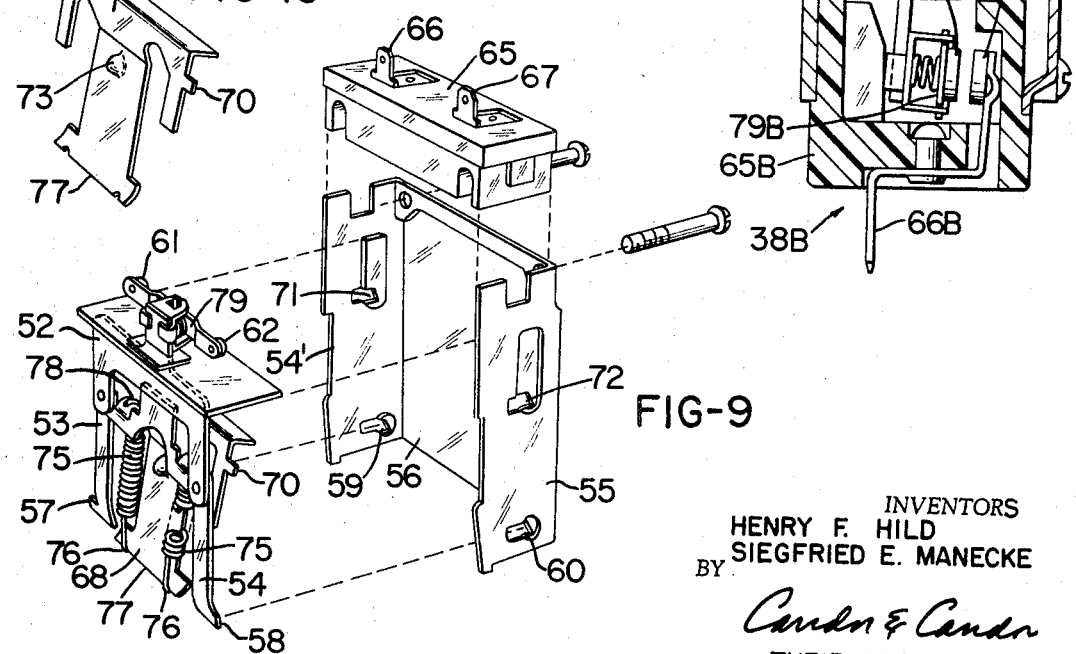
INVENTORS
HENRY F. HILD
SIEGFRIED E. MANECKE
BY
*Carden & Carden*
THEIR ATTORNEYS

United States Patent Office 3,412,235
Patented Nov. 19, 1968

3,412,235
OVEN CONTROL MEANS AND PARTS THEREFOR
OR THE LIKE
Henry F. Hild and Siegfried E. Manecke, Indiana, Pa., assignors to Robertshaw Controls Company, Richmond, Va., a corporation of Delaware
Filed Mar. 7, 1966, Ser. No. 532,463
15 Claims. (Cl. 219—412)

This invention relates to an improved control system for a cooking apparatus or the like as well as to improved parts for operating such a cooking apparatus or the like.

It is well known that various appliance manufacturers are producing cooking apparatus for the home or the like wherein the cooking oven is adapted to be controlled for various types of automatic cooking operations thereof, for automatic non-cooking and warmth retaining operations thereof and for relatively high temperature oven burn-off cleaning operations thereof.

However, it has been found according to the teachings of this invention, that because of the wide range of temperatures being required for such an oven during the above different operations thereof, prior known temperature sensing means have prevented accurate control of the same and/or such prior known temperature sensing means are relatively complicated and expensive for controlling such temperature ranges.

However, according to the teachings of this invention, an improved oven control system is provided wherein all of the operating conditions of the oven are controlled by the temperature sensed by an improved single temperature sensing unit of this invention.

In particular, this invention provides a system wherein a single rod and tube temperature sensing unit is utilized for not only controlling the heating operation of the oven or the like during normal cooking operations thereof, but is also utilized to control the cooking apparatus during the high temperature burn off cleaning operation thereof and the non-cooking and warmth retaining operation thereof, the rod and tube unit being relatively simple to manufacture and being uniquely interconnected to the apparatus to provide the above operations in the manner hereinafter described.

Accordingly, it is an object of this invention to provide an improved control system for a cooking apparatus or the like, the system of this invention having one or more of the novel features set forth above or hereinafter shown or described.

Another object of this invention is to provide an improved temperature sensing unit for controlling the operation of a cooking apparatus or the like, the unit of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 3 is a reduced rear view of the unit of FIGURE 2 and is taken on line 3—3 thereof.

FIGURE 4 is a partial view similar to FIGURE 2 and illustrates the unit in another operating condition thereof.

FIGURE 5 is a perspective view of a lever member of the unit of FIGURE 2.

FIGURE 6 is a schematic view illustrating the improved control system of this invention.

FIGURE 7 is a view similar to FIGURE 1 and illustrates a cooking apparatus utilizing another temperature sensing unit of this invention.

FIGURE 8 is an enlarged, cross-sectional view of the unit of FIGURE 7 and is taken substantially on line 8—8 thereof.

FIGURE 9 is an exploded perspective view of various parts of either the unit of FIGURE 2 or the unit of FIGURE 8.

FIGURE 10 is a perspective viwe of one of the parts of FIGURE 9.

Figure 2:
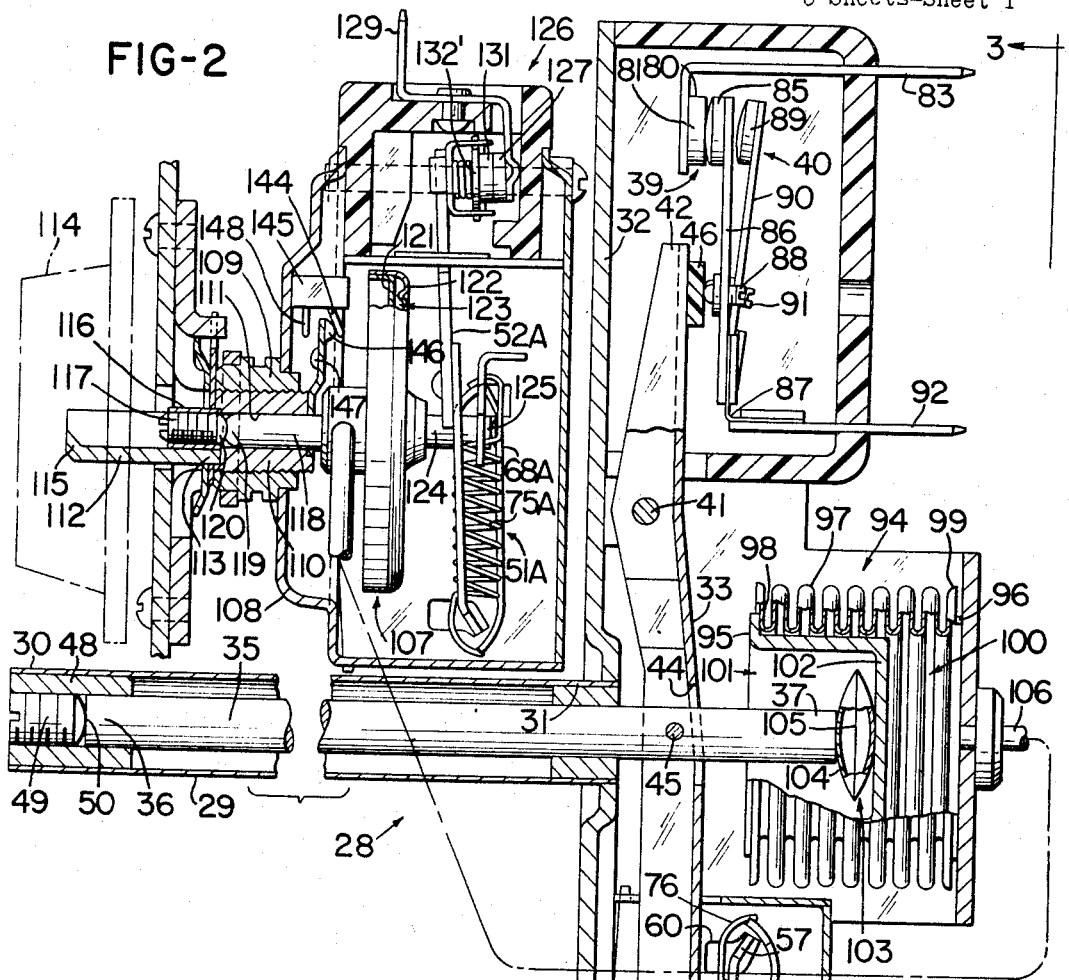
FIGURE 2 is an enlarged, cross sectional view of the control unit of FIGURE 1 and is taken substantially on line 2—2 thereof.

While the various features of this invention are hereinafter described and illustrated as being particularly adaptable for providing the control means for electrical heater means, it is to be understood that the various features of this invention can be utilized singly or in any combination thereof to provide control means for other types of heater means, such as gas burning heating means or the like, as desired.

Therefore, this invention is not to be limited to only the embodiment illustrated in the drawings, because the drawings are merely utilized to illustrate one of the wide variety of uses of this invention.

Figure 1:
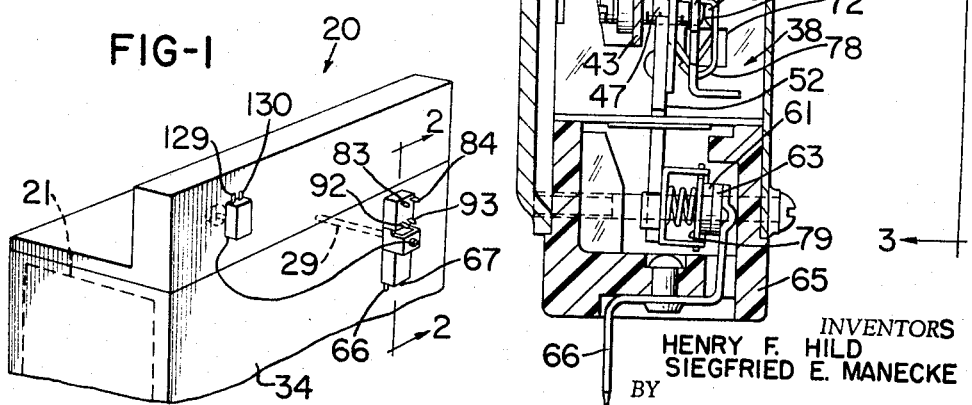
FIGURE 1 is a fragmentary rear perspective view of a cooking apparatus or the like utilizing one control means of this invention.

Referring now to FIGURE 1, the improved control system of this invention is adapted to control various operations of a conventional cooking apparatus, such as the domestic free standing range 20 illustrated schematically in FIGURE 1 which has an oven 21 therein and a control panel means 22.

As illustrated in FIGURE 6, the oven 21 of the cooking apparatus 20 includes a conventional electrical heating means 23 which in the embodiment illustrated in FIGURE 6 comprises an electrically operated bake heating element 24 and electrically operated broil heating element 25, the heating means 23 being adapted to be supplied electrical current from a three wire electrical power source comprising two power lines L1 and L2 and a neutral line N in a manner hereinafter set forth.

The system of this invention is generally indicated by the reference numeral 26 in FIGURE 6 and includes a temperature sensing rod and tube arrangement 28 for not only controlling the normal cooking operations of the oven 21 but also for controlling the high temperature burn off cleaning operation and the low temperature non-cooking and warmth retaining operation of the oven 21 in a manner hereinafter described.

As illustrated in FIGURE 2, the rod and tube temperature sensing unit 28 comprises a tube means 29 having opposed end means 30 and 31, the end means 31 being secured to a frame means 32 to mount the unit 28 against the rear wall or frame means 34 of the cooking apparatus 20.

In this manner, the other end means 30 of the tube means 29 project into the oven 21 to sense the temperature thereof in a manner hereinafter set forth.

A rod means 35 is disposed in the tube means 29 and has one end means 36 adapted to move in unison with the end means 30 of the tube means 29 in a manner hereinafter described while the other end means 37 of the rod means 35 projects out of the open end 31 of the tube means 29 for a purpose hereinafter described.

The frame means 32 of the unit 28 is adapted to carry a plurality of electrical switches to be operated in accordance with the movement of the end means 37 of the rod means 35 in the manner hereinafter described, the embodiment of the unit 28 illustrated in FIGURE 2 including three electrical switches generally indicated by the reference numerals 38, 39 and 40.

The electrical switch means 38 is adapted to control the high temperature burn off cleaning operation of the oven 21, the electrical switch 39 is adapted to control a switching latch means for the oven door during the high temperature burn off cleaning operation and the electrical switch 40 is adapted to control the low temperature non-cooking and warmth retaining operation of the oven 21 in a manner hereinafter described.

The tube means 29 of the unit 28 has a higher coefficient of the thermal expansion and contraction than the coefficient of thermal expansion and contraction of the rod means 35 whereby the end means 30 of the tube means 29 will move to the left in FIGURE 2 upon a rise in temperature in the oven 21 and will move to the right in FIGURE 2 upon a decrease in temperature in the oven 21. Since the end means 36 of the rod means 35 follows the movement of the end means 30 of the tube means 29 in a manner hereinafter described and since the rod means 35 has a lower coefficient of thermal expansion and contraction than the tube means 29, the end means 37 of the rod means 35 will move to the left in FIGURE 2 upon the unit 28 sensing an increase in the temperature in the oven 21 and will move to the right in FIGURE 2 upon the unit 28 sensing a decrease in temperature in the oven 21 whereby the movement of the end means 37 of the rod means 35 will control the operation of the switch means 38–40 in a manner now to be described.

A lever member 33 is pivotally mounted to the frame means 32 by a pivot pin 41 intermediate the opposed ends 42 and 43 of the lever 33. The lever 33 has an opening 44 passing therethrough and receiving the rod means 35, the rod means 35 being interconnected to the lever 33 by a pivot pin means 45. The end 42 of the lever 33 carries an insulation block 46 for operating the switch means 39 and 40 in a manner hereinafter described. The other end 43 of the lever 33 carries an adjustable pin means 47 for controlling the operation of the switch means 38 in the manner hereinafter described.

The end means 30 of the tube means 29 carries an internally threaded member 48 receiving a threaded adjusting member 49 having an end 50 abutting the end 36 of the rod means 35 whereby the position of the rod means 35 within the tube means 29 can be readily adjusted by the adjusting member 49 as the end 36 of the rod 35 is normally urged into contact with the end 50 of the adjusting member 49 in the manner hereinafter described.

Thus, when the unit 28 senses an increase in temperature in the oven 21 to cause the tube means 29 to elongate to the left in FIGURE 2, the end means 37 of the rod means 35 moves to the left therewith and, through the pivot pin 45, causes the lever member 33 to have the ends 42 and 43 thereof pivot in a clockwise direction. Conversely, when the unit 28 senses a decrease in the temperature of the oven 21, the end means 37 of the rod means 35 is moved to the right in FIGURE 2 and causes the end means 42 and 43 of the lever 33 to pivot in a counterclockwise direction.

Movement of the end 43 of the lever 33 controls the operation of the switch means 38 through a lever means 51 thereof.

In particular, it can readily be seen in FIGURES 2, 9 and 10, that the lever means 51 includes a first lever member 52 having a pair of legs 53 and 54 respectively pivotally mounted to the opposed walls 54' and 55 of a casing means 56 by outwardly directed tangs 57 and 58 thereof being received in pivot slots 59 and 60. The lever member 52 carries a pair of electrical contacts 61 and 62 which move in unison with the lever member 52 and are respectively cooperable with a pair of fixed contacts 63 and 64, FIGURE 6, carried by a housing means 65 of the electrical switch means 38 and respectively interconnected to terminals 66 and 67 thereof.

A second lever member 68 is provided and is pivotally mounted to the casing means 56 by having outwardly directed tangs 69 and 70 thereof respectively received in pivot slots 71 and 72 in the side walls 54' and 55 of the casing 56. The lever member 68 has an embossment 63 which abuts the end 74 of the adjusting member 47 of the lever 43.

A pair of tension spring means 75 each has one end 76 thereof interconnected to the free end 77 of the lever member 68 and the other end 78 interconnected to the lever member 52 whereby the tension spring means 75 cause the lever member 52 to move with a snap movement during its opening and closing operation of the switch means 38.

The adjusting member 47 can be so adjusted relative to the end 43 of the lever 33 that when the unit 28 senses the temperature above a predetermined temperature, such as around 950° F. during the oven burn-off cleaning operation, the end means 37 of the rod means 35 has moved to the left in FIGURE 2 such a distance that the end 43 of the lever 33 has moved in a clockwise direction away from the lever means 51 to cause the tension spring means 75 to cause the lever member 52 to snap to the left and break the electrical connection between the terminals 66 and 67 of the switch means 38 as the contacts 61 and 62 have been respectively moved away from the fixed contacts 63 and 64, the contacts 61 and 62 being electrically interconnected together by a bridging member 79.

When the temperature of the oven 29 falls below the predetermined high temperature setting for the clean off operation thereof, the end means 37 of the rod means 35 has moved back to the right in FIGURE 2 a distance to cause the end 43 of the lever 33 to move in a counterclockwise direction toward the lever means 51 a distance to cause movement of the lever member 68 to snap the lever member 52 back to the right to again electrically interconnect the terminals 66 and 67 thereof for a purpose hereinafter described.

As illustrated in FIGURES 2 and 3, the electrical switch means 39 and 40 each includes a fixed contact 80 and 81 respectively interconnected to terminals 83 and 84. The switch means 39 carries a movable contact 85 cooperable with the fixed contact 80 and being carried on a blade means 36 which is normally urged in a contact closing direction by the natural force of a leaf spring 87, the blade 86 carrying a threaded adjusting member 88 for abutting against the insulation block 46 on the end 42 of the lever 33. Similarly, the switch means 40 includes a movable contact 89 carried on a blade 90 urged in a direction to place the contact 89 into contact with the fixed contact 81 by a leaf spring 87, the blade 90 also carrying a threaded adjusting member 91 adapted to abut the insulation block 46 of the lever 33.

Accordingly, by adjusting the relative position of the adjusting members 88 and 91 relative to the blades 86 and 90, the switch means 39 and 40 will be opened at different temperatures sensed by unit 28 and will close at different temperatures sensed by the unit 28.

For example, when the unit 28 is sensing a temperature below a safe temperature that would require the oven door latch means to be positively held in its latched position, the end means 37 of the rod means 35 is in such a position to the right in FIGURE 2 that the end 42 of the lever 33 permits the blade 36 to place the contact 85 into contact with the contact 80 so that the terminal 83 is electrically interconnected to a terminal 92 electrically interconnected to the blade 86.

However, when the temperature in the oven 21 rises to approximately 600° F., the end means 37 of the rod means 35 of the unit 28 has moved to the left in FIGURE 2 to such a position that the lever member 33 following the movement thereof causes the block 46 to move to the right in FIGURE 2 a distance sufficient to move the contact 85 away from the contact 80 so that no electrical current can flow between the terminals 83 and 92 of the switch means 39.

Similarly, the switch means 40 can be utilized in such a manner that as long as the unit 28 is sensing a temperature below a preselected warmth-retaining and non-cooking temperature, such as 170° F., the end 42 of the lever 33 is in such a position that the contact 89 can be urged into electrical contact with the fixed contact 81 to electrically interconnect the terminal 84 with a terminal 93 of the switch means 40. However, when the unit senses a temperature above 170° F., the lever member 33 is pivoted in a clockwise direction to cause the contact 89 to move out of contact with the fixed contact 81 to disconnect the electrical connection between the terminals 84 and 93.

Movement of the end means 37 of the rod means 38 of the unit 28 also causes actuation of a pneumatic fluid containing chamber defining means 94. The chamber defining means 94 is a bellows construction formed from a pair of rigid wall means 95 and 96 interconnected together by a tubular bellows construction 97 having the opposed ends 98 and 99 thereof respectively sealed and secured to the rigid wall means 95 and 96 to define a chamber 100 therebetween.

The rigid wall means 96 is secured from movement to the frame mean 32 and the rigid wall means 95 is movable relatively thereto and is substantially cup-shaped to define an opened end 101 and a closed end 102 thereof.

The end means 37 of the rod means 35 is received in the open end 101 of the cup-shaped movable wall means 95 and engages an ambient temperature compensating means 103 disposed between the end means 37 and the closed end 102 of the movable wall means 95. In the embodiment illustrated in the drawings, the ambient temperature compensating means 103 comprises a pair of cup-shaped disc members 104 formed of bimetallic material and having the opened ends 105 thereof abutting each other.

In this manner, should the ambient temperature surrounding the end means 37 of thhe rod means 35 increase to tend to cause the pneumatic fluid in the chamber 100 to heat up and expand, the cup-shaped bimetal members 104 tend to flatten to permit the fluid in the chamber 100 to expand and thereby prevent the same from being forced out of the chamber 100 into a conduit means 106 to a chamber of another pneumatic fluid containing chamber defining means 107. Conversely, should the ambient temperature surrounding the chamber defining means 94 decrease to tend to cause a contraction in the pneumatic fluid in the chamber 100, the bimetal members 104 tend to further bow to reduce the volumetric capacity of the chamber 100 so that the fluid will not be drawn from the other chamber defining means 107 through the conduit 106 into the chamber 100.

The other chamber defining means 107 is disposed in a casing 108 mounted to the control panel 22 of the cooking apparatus 20 by suitable mounting means. The casing 108 includes an internally threaded member 109 threadedly receiving an externally threaded adjusting member 110 having a bore 111 passing therethrough. A control shaft 112 has one end 113 fixed to the adjusting member 110 and receives a control knob 114 on the other end 115 thereof. The shaft 112 carries an internally threaded member 116 receiving a threaded calibration screw 117 adapted to be adjusted relative to the threaded member.

The chamber defining means 107 includes a stem 118 receivable in the bore 110 and has an end 119 disposed against the end 120 of the adjusting screw 117. The chamber defining means 107 is a conventional expandable and contractible fluid containing element having two cup-shaped elements 121 and 122 secured together at the outer periphery thereof to define a chamber 123 therebetween, the wall means 121 being substantially fixed while the wall means 122 is movable in response to the volume of pneumatic fluid in the chamber 123 in the manner hereinafter set forth.

The movable wall means 122 of the chamber defining means 107 carries a stem 124 having an end 125 adapted to abut a lever member 68A of a lever means 51A disposed in the casing 108 and formed substantially identical to the lever means 51 previously described.

Since the lever means 51A is substantially identical to the lever means 51 previously described, parts of the lever means 51A substantially identical to the lever means 51 previously described are indicated by like reference numerals followed by the reference letter A.

As illustrated in FIGURE 2, the lever means 51A is so constructed and arranged that the same operatively interconnects an electrical switch means 126 carried by the casing 108 to the chamber defining means 107.

The switch means 126 is substantially identical to the switch means 38 previously described and as illustrated in FIGURES 2, 4 and 6 includes a pair of fixed contacts 127 and 128 respectively interconnected to terminals 129 and 130 to be electrically connected together when the movable contacts 131 on the bridging member 132' of the lever member 52A are disposed against the fixed contacts 127 and 128 in the manner previously described for the switch means 38.

The control knob 114 comprises a selector means which when rotated relative to the control panel 22 will cause rotation of the adjusting member 110 and, thus, threaded axial movement of the adjusting member 110 relative to the fixed threaded member 109 of the casing means 108. Such axial movement of the adjusting member 110 also axially positions the end 120 of the adjusting member 117 whereby the spring means 75A of the lever means 51A causes the end 119 of the stem 118 of the chamber defining means 107 to follow the movement of the end 120 of the adjusting screw 117 so that the position of the chamber defining means 107 relative to the casing 108 and, thus, relative to the lever 68A can be adjusted by the control knob 114.

Accordingly, when the housewife, or the like, adjust the control knob 114 to a desired temperature setting position thereof to cause operation of the heating means 23 in a manner hereinafter set forth, the tube means 29 of the unit 28 will move to the left or the right in FIGURE 2 depending upon an increase or decrease in the temperature of the oven 21 and since the rod means 35 has a lower coefficient of thermal expansion and contraction of the tube means 29, the tube means 29 will cause the end 37 of the rod means 29 to move to the left upon an increase in temperature and move to the right on a decrease in temperature.

When the unit 28 is sensing an increase in temperature in the oven 21, the end means 37 of the rod means 35 moves to the left whereby the natural resiliency of the bellows construction 97 causes the wall means 95 to move in unison with the end means 37 to the left to increase the volumetric capacity of the chamber 100 whereby fluid is drawn from the chamber 123 of the chamber defining means 107 to fill the increased volume of the chamber 100 whereby the movable wall 122 of the chamber defining means 107 also moves to the left to correspondingly decrease the volumetric capacity of the chamber 123. With the wall 122 now moving to the left, the end 125 of the stem 124 also moves to the left permitting the lever member 68A to follow such leftward movement in such a manner that the spring means 75A of the lever means 51A will cause the lever member 52A to snap to its open position when the unit 28 senses an increase in temperature in the oven 21 above the temperature selected by the control knob 114.

In this manner, the contact means 131 are moved away from the contact means 127 and 128 to prevent current flow between the terminals 129 and 130.

Conversely, when the unit 28 senses a decrease in the temperature of the oven 21, the end means 37 of the rod means 35 moves to the right in FIGURE 2 and collapses the bellows member 97 to reduce the volumetric capacity of the chamber 100 whereby the fluid therein is forced out of the chamber 100 and through the conduit means 106 into the chamber 123 of the chamber defining means 107 to move the stem 124 thereof to the right in FIGURE 4. When the temperature being sensed by the unit 28 falls below the temperature selected by the knob 114, such rightward movement of the stem 124 of the chamber defining means 107 causes the lever means 51A to move the lever member 52A with a snap movement to close the contact means 131 against the contacts 127 and 128 of the switch 126 to again electrically interconnect the terminals 129 and 130 thereof.

Therefore, it can be seen that the rod and tube arrangement 28 is adapted to accurately control the operation of the switch means 126 even though the switch means 126 and the chamber defining means 107 are disposed in a remote location relative to the chamber defining means 94 sensing the movement of the end means 37 of the rod means 35.

The temperature sensing unit 28 is adapted to be utilized in the system 26 of this invention in a manner now to be described to control the operations of the cooking apparatus 20.

In particular, it can be seen in FIGURE 6 that the power lead L1 is interconnected to a lead 131 which, in turn, is electrically interconnected to the contacts 127, 63, 80 and 81 by branch leads 132, 133, 134 and 135 through the terminals 129, 83, 84 and 66.

The contact 128 of the switch means 126 is interconnected to a switch blade 136 by a lead 137 interconnected to the terminal 130, the switch blade 137 having one position against a contact 138 leading to one side 139 of the bake element 24 by a lead 140, another position against a contact 141 electrically interconnected to one side 142 of the broil element 25 by a lead 143 and another position intermediate the contacts 138 and 141 as illustrated in dotted lines in FIGURE 6.

The switch blade 136 is controlled by a plunger 144 of a limit switch 145, FIGURE 2, carried by the casing 108 and actuated by cam means 146 carried by the adjusting member 110.

Thus, when the control knob 114 is disposed in its "keep warm" position, the cam means 146 holds the switch blade 136 intermediate the contacts 138 and 141. When the control knob 114 is disposed in any of its temperature setting positions for controlling a cooking operation utilizing the bake element 24, the cam means 146 causes the switch blade 136 to be disposed against the contact 138 in the manner illustrated in full lines in FIGURE 6. However, when the control knob 114 is disposed in its "broil" position, the switch blade 136 is disposed against the contact 141.

When the control knob 114 is set in its "burn-off" position, the cam means 146 again positions the switch blade 136 in the dotted position of FIGURE 6 between the contacts 138 and 141.

In the "burn-off" position of the selector knob 114, the other side 147 of the cam means 146 operates another plunger 148 of the switch means 145 to position a first switch blade 149 against contact 150 and a second switch blade 149A against a contact 151, the switch blade 149A being interconnected to a lead 152 leading to the contact 64 of the switch means 38 through the terminal 67 thereof.

The switch blade 149 is interconnected to the contact 141 by a lead 153. The contact 150 is interconnected to a contact 154 of a safety switch 155 by a lead 156, the safety switch 155 having a switch blade 156 normally urged against a contact 157 but movable against the contact 154 when the door latch lever 158 is moved from its unlatched position illustrated in full lines in FIGURE 6 over to its door latching position illustrated in dotted lines in FIGURE 6. However, the door latch member 158 cannot be moved to its door latching position until a solenoid coil 159 is energized to raise a pin 160, one side 161 of the coil 159 being interconnected to a relay contact 162 by a lead 163 and the other side 164 being connected to a lead 165 by a lead 166. The lead 165 is electrically interconnected to the neutral lead N of the power source.

Another switch 167 is provided and comprises a switch blade 168 interconnected to the lead 163 by a lead 169 and normally being held away from a contact 170 by the latch member 158 when in its unlatched position but moving against the contact 170 when the latch member 158 is moved to its latched position, the contact 170 being interconnected to a contact 171 by a lead 172. The contacts 162 and 171 form part of a relay 173 and respectively cooperate with contacts 174 and 175 leading to a contact 176 of a manually operated normally open push button switch 177 by a lead 178.

The push button 177 is adapted to bridge the contact 176 with the contact 179 leading to the contact 85 of he switch means 39 by a lead 180 to the terminal 92.

The relay 173 has a solenoid coil 181 for moving a switch member 182 upwardly when the coil 181 is energized to move a bridging member 183 out of bridging contact with the contacts 171 and 175 and to place a bridging member 184 into bridging relation with the contacts 162 and 174. The solenoid coil 181 has one side 185 thereof interconnected to the neutral lead 165 by a lead 186 and the other side 187 thereof interconnected to the contact 157 of the switch 155 by a lead 188.

The contact 89 of the "keep warm" switch means 40 is interconnected to a lead 189 through the terminal 93 thereof.

The contact 151 is interconnected to the lead 165 by a lead 190 having a "burn-off" indicating light 191 therein, the lead 190 being interconnected to the switch blade 156 of the switch 155 by a lead 192.

The other sides 193 and 194 of the elements 25 and 24 are interconnected to the power source lead L2 by lead means 195.

The lead 189 is connected to a switch blade 196 which is always held open by the cam means 146 of the selector 114 except in its "keep warm" position wherein the cam means 146 moves the switch blade 196 against a contact 197 connected to the lead 140 by a lead 198.

The operation of the control system 16 of this invention will now be described.

With the selector knob 114 disposed in its "off" position, the chamber defining member 107 has been moved to the right in FIGURE 6 such a distance that the lever member 52A is held in its opened position to prevent interconnection between the contacts 127 and 128 thereof regardless of the temperature in the oven 21 and the cam means 146 is so positioned that the switch blades 196, 149 and 149A are held away from the contacts 197, 150 and 151 whereby no electrical current from the power source can be connected to the heater means 23.

If the housewife desires to utilize the oven 21 only for a "keep warm" and non-cooking warmth retaining operation thereof, the housewife turns the control knob 114 to the "keep warm" position thereof whereby the switch blade 136 is moved by the cam means 146 to an intermediate dotted position between the contacts 138 and 141 so that no current can flow through the switch means 126 to the heater means 23. In the "keep warm" position of the selector knob 114, the switch blade 196 is moved against the contact 197 whereby the bake element 24 is adapted to be placed across the power leads L1 and L2 by only the switch means 40. As long as the temperature of the oven 21 remains below the keep warm setting of the switch 40, the contact means 81 and 89 of the switch 40 are closed so that current flows through the bake element 24 to heat the oven 21. However, when the unit 28 senses a temperature above the set "keep warm" temperature, the end 37 of the rod means 35 has moved to the left in FIGURE 2 a distance sufficient to cause opening of the contacts 81 and 89 to terminate the operation of the bake element 24. Thus, in the "keep warm" setting of the control knob 114, the bake element 24 is cycled on and off by the unit 28 through the switch means 40 whereby the temperature in the oven 21 is maintained at the keep warm temperature of approximately 170°.

When the housewife desires to utilize the oven 21 for a normal cooking operation utilizing the bake element 24, the housewife sets the control knob 114 at the desired temperature setting thereof, such as 325° F., whereby the cam means 146 holds the switch blade 136 against the contact 138, opens the switch blade 196 away from the contact 197 and maintains the switch blades 149 and 149A away from the contacts 150 and 151. Since the chamber defining means 107 has now been moved to the left in FIGURE 2 by the adjustment of the control knob 114 in a "cooking" position thereof, current is adapted to flow through the contacts 127 and 128 of the switch 126 as long as the temperature in the oven 21 sensed by the unit 28 is below the temperature setting of the control knob 114 whereby the bake element 24 is placed across the power leads L1 and L2 by the closed switch 126. However, when the temperature of the oven 21 exceeds the temperature set by the control knob 114 as sensed by the unit 28, the bridging member 132' of the switch 126 is moved away from bridging relation with the contacts 127 and 128 to terminate the operation of the bake element 24. Thus, it can be seen that in a baking operaion of the oven 21, the bake element 24 is cycled on and off by the switch means 126 under the control of the temperature sensing unit 28 to maintain the temperature in the oven 21 at the temperature selected by the control knob 114.

When the housewife or the like desires to utilize the cooking apparatus 20 for a broiling operation thereof, the housewife turns the selector knob 114 to the "broil" position thereof whereby the cam means 146 moves the switch blade 136 against the contact 141 while maintaining the switch blade 196 away from its contact 197 and the switch blades 149 and 149A away from their respective contacts 150 and 151 whereby the broil element 25 is energized and deenergized under the control of the switch 126 in response to the temperature sensed by the unit 28 in a manner similar to the above described cooking operation for the bake setting of the selector knob 114.

When the housewife or the like desires to utilize the control system 26 of this invention to effect a cleaning of the oven 21, the housewife turns the selector knob 114 to its "burn-off" position whereby the cam means 146 maintains the switch blade 196 away from the contact 197, maintains the switch blade 136 away from the contacts 138 and 141 and places the switch blades 149 and 149A against the contacts 150 and 151 whereby the burn-off light 191 is energized. However, the closed switch 38 cannot energize the broil element 25 until the housewife moves the latch member 158 to its dotted line latching position of FIGURE 6. In order to move the latch member 158 past the pin 160 to its latching position, the housewife must push in on the button 177. Since the relay member 182 is now in its up position because the switch blade 149A has caused the coil 181 to be energized, the button 177, when pushed in, bridges the contacts 176 and 179 and current flows across the contacts 174 and 162 by the bridging member 184 to place the solenoid coil 159 across the power leads L1 and N whereby the pin 160 is drawn upwardly so that the housewife can manually move the latching member 158 from its unlatched position to its latched position illustrated in dotted lines in FIGURE 6. With the latch member 158 in its latched position, the button 177 is released whereby the coil 159 is deenergized and the latch pin 160 drops into place so that the latch member 158 cannot be moved from its latched position back to its unlatched position until the coil 159 is again energized. With the latch member 158 in its latched position, the switch blade 156 is now against the contact 154 and the switch blade 168 is against the contact 170 whereby the power lead L1 is interconnected to the closed switch 38, switch blade 149A, contact 154 of the switch 156 through the contact 150 and through the switch blade 149 to place the broil element 25 across the leads L1 and L2 for the burn-off operation. Since the switch blade 156 has been moved away from the contact 157, the solenoid 181 is deenergized and the relay member 182 drops down to the full line position illustrated in FIGURE 6 whereby the solenoid 159 of the latching pin 160 can only be energized to raise the pin 160 by pushing in of the button 177. However, as the temperature of the oven 21 exceeds the safety temperature set by the switch 39, the contact 85 is moved away from the contact 80 by the sensing unit 28 so that pushing in on the button 177 while the oven 21 is at a temperature above 600° F. or the like, will not cause the latch pin 160 to be withdrawn to move the latch member 158 to its unlatching position whereby the oven door cannot be opened when the temperature is above 600° F. and the system 26 will not permit the temperature in the oven to exceed 600° F. unless the latch member 158 is in its oven door latching position.

The sensing unit 28 controls the operation of the switch 38 in accordance with the temperature in the oven 21 to maintain the temperature in the oven 21 at the burn-off temperature, such as 950° F., by maintaining the switch 38 closed when the temperature is below the clean-off temperature and opening the switch 38 when the temperature of the oven 21 is above the clean-off temperature.

After the desired length of time of the cleaning operation of the oven 21, the control knob 114 is either turned manually or automatically, such as by the timer clock means or the like, to its "off" position whereby the switch blades 149 and 149A are again moved away from the contacts 150 and 151 to terminate the operation of the broil element 25 under the control of the switch means 38 whereby the temperature of the oven 21 gradually drops. However, the oven door cannot be opened until the temperature of the oven drops below the temperature setting of the safety switch 39 at which time the sensing unit 28 will have caused the contact 85 to be again placed against the contact 80. With the contact 85 now against the contact 80, the housewife can push in on the button 177 to energize the solenoid coil 159 through the relay arm 183 of the relay 173 and the closed switch 167 to cause the pin 160 to be drawn upwardly whereby with the pin 160 in its up position, the housewife can move the latching member 158 from its latched position back to its unlatched position as illustrated in FIGURE 6 to permit opening of the oven door.

While the system and method 26 of this invention has been previously described with the broil element 25 providing the burn-off operation of the oven 21, it is to be understood that both the bake and broil elements 24 and 25 can be utilized in a burn-off operation or just the bake element 24 if desired without departing from the intent of this invention as such modifications fall within the scope of the appended claims.

Another rod and tube temperature sensing unit of this invention is generally indicated by the reference numeral 200 in FIGURES 7 and 8 and is utilized to control the various operations of the oven means 201 of the cooking apparatus 202 of FIGURE 7 in a manner similar to the apparatus 20 previously described.

The unit 200 includes a tube means 203 having opposed ends 204 and 205, the end 205 being fixed to a frame means 206 adapted to be secured to the rear wall means 207 of the apparatus 202 so that the end 204 projects into the oven 201 to sense the temperature thereof. A rod means 208 is disposed in the tube means 203 and has an end means 209 movable in unison with the end means 204 of the tube means 203. The other end means 210 of the rod means 208 projects out of the end 205 of the tube means 203 and has a bore 211 receiving a stem 212 of an expansible and contractible chamber defining means 213.

The chamber defining mean 213 is formed in the same manner as the chamber defining means 107 previously described and has a movable wall 215 and a fixed wall 216 defining a chamber 217 therebetween. The chamber 217 of the chamber defining means 213 is fluidly interconnected with the chamber of a bellows construction 218 by a conduit 219, the bellows construction 218 being adapted to be expanded and collapsed by inward and outward movement of an adjusting member 219 relative to a front wall 220 of the control panel 221 of the apparatus 202. The adjusting member 219 is controlled by a selector knob 222.

The movable wall 215 of the chamber defining means 213 has a stem 223 which operates a lever means 51B to control the operation of electrical switch means 38B. Since the lever means 51B and switch means 38B are substantially identical to the lever means 51 and switch means 38 previously described, the parts of the lever means 51B and switch means 38B are indicated by like reference numerals followed by the reference letter B.

A lever 234 is pivoted to the frame means 206 by a pivot pin 235 and is interconnected to the end 219 of the rod means 208 by a pin means 236. The end 237 of the lever 234 is adapted to operate two switch means 39B and 40B in the same manner that the lever 33 operates the switch means 39 and 40 previously described whereby like parts of the switch means 39B and 40B are indicated by like reference numerals followed by the reference letter B.

The temperature sensing unit 200 of this invention is adapted to be utilized in substantially the same manner as the unit 28 previously described to control all operations of the oven 201 of the apparatus 202, the switch means 38B however being adapted to interconnect and disconnect the power source to the heating means of the oven 201 on all cooking operations and cleaning operations depending upon the temperature setting set by the control knob 222, the switch means 39B controlling the latch operation in the manner previously described, and the switch means 40B controlling the operation of the heating means during a keep warm setting of the knob 222.

The initial temperature setting for the unit 200 is controlled by the expansion and collapsing of the bellows 218 to draw fluid from the chamber 217 or to pump fluid therein by adjustment of the knob 222 whereby the position of the movable wall 215 and, thus, stem 233 is set relative to the lever means 51B.

Thus, upon an increase in temperature over the selected temperature, the rod means 208 will cause opening of the switch 38B in the manner previously described and upon a decrease in temperature in the oven 201 below the selected temperature, the rod means 208 will cause closing of the switch 38B.

However, regardless of the temperature setting set by the control knob 222 the switch means 39B will be operated by the rod means 208 to control the oven latch means in the manner previously described and the switch means 40B will control the non-cooking and warmth retaining operation of the oven 201 in the manner previously described when the knob 222 is in its "keep warm" position.

Thus, it can be seen that the unit 200 of this invention maintains all of the switch means that are operated by the rod means 208 adjacent thereto in a compact arrangement while permitting adjustment of the chamber defining means 213 throughout a wide temperature range from a location remote from the unit 200 by the bellows construction 218.

It is to be understood that the various adjustments for the switch means of the various embodiments of this invention can be manually controlled by the housewife or the like by merely providing mechanical means between the various adjusting screws and the like and the control panel of the apparatus so that control knobs can be adjusted to selectively change the particular temperature setting for the opening and closing of the respective switch means.

Therefore, it can be seen that this invention not only provides an improved control system for a cooking apparatus or the like, but also this invention provides an improved temperature sensing unit for a cooking apparatus or the like.

While the form of the invention now preferred has been disclosed as required by statute, other forms may be used, all coming within the scope of the claimed subject matter which follows:

What is claimed is:

1. A control system for a cooking apparatus having an oven provided with heating means therefor, said system comprising selector means for selecting a normal temperature cooking operation of said oven and a high temperature burn-off cleaning operation of said oven, and rod and tube temperature sensing means operatively interconnected to said heating means and to said selector means for thermostatically controlling said heating means during both of said cooking and burn-off cleaning operations of said heating means as selected by said selector means.

2. A control system as set forth in claim 1 wherein said oven has latch means for holding the oven door in its closed position during said cleaning operation thereof, said latch means having actuating means for holding said latch means in its latched position, said rod and tube means controlling the operation of said actuating means whereby said latch means cannot be unlatched when said rod and tube means senses a temperature above a predetermined temperature.

3. A control system as set forth in claim 1 wherein said selector means has means for selecting a non-cooking and warmth retaining temperature operation of said oven, said rod and tube means thermostatically controlling said heating means during said non-cooking and warmth retaining operation when selected by said selector means.

4. A control system as set forth in claim 1 wherein said rod and tube means comprises a single rod and tube unit.

5. A rod and tube temperature sensing unit having a rod means and a tube means, a first electrical switch for controlling the operation of a heating means for a cooking operation thereof, first means operatively interconnecting said rod means to said first switch to thermostatically control the same, a second electrical switch for controlling another operation of said heating means, second means operatively interconnecting said rod means to said second switch to thermostatically control the same, and selector means operatively interconnected to said first switch to select a cooking temperature that will cause said rod means to open said first switch when said unit senses a temperature above said selected temperature and will cause said rod means to close said first switch when said unit senses a temperature below said selected temperature, a rod and tube unit wherein said first interconnecting means comprises a fluid transmitting means.

6. A rod and tube unit as set forth in claim 5 wherein said second interconnecting means includes a lever pivoted to said rod means.

7. A rod and tube unit as set forth in claim 5 wherein said second switch is adapted to control a high temperature burn-off cleaning operation of said heating means when selected by said selector means.

8. A rod and tube unit as set forth in claim 5 wherein said second switch is adapted to control a low temperature non-cooking and warmth retaining operation of said heating means when selected by said selector means.

9. A rod and tube unit as set forth in claim 5 wherein said second switch is adapted to control a latch operating means.

10. A rod and tube unit as set forth in claim 5 wherein said first interconnecting means includes a chamber defining means that is adapted to expand and collapse.

11. A rod and tube unit as set forth in claim 10 wherein said rod means moves said chamber defining means upon temperature changes sensed by said unit without varying the volumetric capacity of said chamber defining means.

12. A rod and tube unit as set forth in claim 11 wherein said selector means includes fluid transmitting means for expanding or collapsing said chamber defining means to select a cooking temperature.

13. A rod and tube unit as set forth in claim 12 wherein said selector means can select a high temperature setting for said first switch to thermostatically control a burn-off cleaning operation of said heating means.

14. A rod and tube unit as set forth in claim 10 wherein said rod means expands and collapses said chamber defining means in relation to temperature sensed by said unit.

15. A rod and tube unit as set forth in claim 14 wherein said first interconnecting means includes another chamber defining means fluidly interconnected to said first-named chamber defining means.

References Cited

UNITED STATES PATENTS

| | | | |
|---|---|---|---|
| 2,782,285 | 2/1957 | Cantlin | 200—137 |
| 2,851,559 | 9/1958 | Rosen | 200—137 |
| 3,027,444 | 3/1962 | Week | 126—273 |
| 3,327,094 | 6/1967 | Martin et al. | 219—393 |
| 3,045,085 | 7/1962 | Reingruber | 200—137 |

BERNARD A. GILHEANY, *Primary Examiner.*

H. B. GILSON, *Assistant Examiner.*